Patented July 13, 1954

2,683,725

UNITED STATES PATENT OFFICE 2,683,725

TESTOSTERONE DERIVATIVES AND PROCESS

Herbert C. Murray, Hickory Corners, and Durey H. Peterson, Kalamazoo, Mich., assignors to The Upjohn Company, Kalamazoo, Mich., a corporation of Michigan No Drawing. Application January 15, 1953, Serial No. 331,492

10 Claims. (Cl. 260—397.4)

This invention relates to steroids and more particularly to certain testosterone derivatives namely 6β-hydroxytestosterone, 6β-hydroxy-10-normethyltestosterone and their esters represented by the following formula:

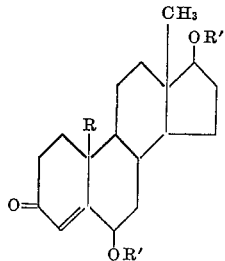

wherein R is hydrogen or methyl and R' is hydrogen or the acyl radical of an aliphatic or carbocyclic carboxylic acid.

It is an object of this invention to provide the novel 6β-hydroxytestosterone, 6β-hydroxy-10-normethyltestosterone and their esters, and a process of preparing the same. Other objects will be apparent to those skilled in the art to which this invention pertains.

The novel compounds of the present invention may be prepared from testosterone or 10-normethyltestosterone by the oxygenating action of a culture of fungus, particularly of the order Mucorales and the species Rhizopus reflexus as described in application S. N. 297,242, filed July 5, 1952, of which this is a continuation-in-part.

Esterification may be accomplished by admixing 6β-hydroxytestosterone or 6β-hydroxy-10-normethyltestosterone with an acylating agent such as, for example, ketene, a ketene of a selected acid, an acid, acid chloride or acid anhydride, or other known acylating agent, usually in a solvent such as, for example, pyridine or the like, or an inert solvent, including solvents like benzene, toluene, ether, and the like, for example, and heated at a temperature between about zero degrees centigrade and the boiling point of the reaction mixture usually about room temperature, for a period between about a half hour and about 96 hours. The time of reaction as well as the temperature at which the reaction is carried out, the acylating agent, and the ratio of reactants may be varied. The reaction mixture is suitably poured into ice or cold water, the product collected in an appropriate solvent which is thereafter washed with successive portions of a mildly basic solution and water to obtain a solution of the product which is essentially neutral.

In some instances, the product may crystallize from the reaction mixture, in which case it may be advantageous to separate the product by filtration or other means, wash with water, and thereafter purify by conventional means, such as, for example, by recrystallization from a suitable solvent or by chromatographic purification, as deemed necessary.

The thus-described acylation process, and as illustrated in more detail in the examples following in this specification, produces both the monoesters and the di-esters, although in different proportions, depending upon the proportions of acylating agent to 6β-hydroxytestosterone or 6β-hydroxy-10-normethyltestosterone. Using approximately one equivalent of acylating agent to steroid produces predominantly the mono-acylated product, whereas with about two or more equivalents of acylating agent to steroid, the predominant product is the diacylated product.

The following examples are illustrative of the process and products of the present invention, but are not to be construed as limiting.

*Example 1.—6β-hydroxytestosterone*

A medium was prepared of twenty grams of Edamine enzymatic digest of lactalbumin, three grams of corn steep liquor and fifty grams of technical dextrose diluted to one liter with tap water and adjusted to a pH of 4.3 to 4.5. To 120 liters of this sterilized medium, there was added an inoculum of Rhizopus reflexus, American Type Culture Collection Number 1225, and the medium was incubated for 24 hours at a temperature of 28 degrees centigrade using a rate of aeration and stirring such that the oxygen uptake was 6.3 to 7 millimoles per hour per liter of $Na_2SO_3$ according to the method of Cooper, Fernstrom and Miller, Ind. Eng. Chem., 36, 504 (1944). To this medium, containing a 24-hour growth of Rhizopus reflexus, was added sixty grams of testosterone dissolved in one liter of absolute ethanol to provide a suspension of steroid in the culture. After an additional 24-hour period of incubation under the same conditions of temperature and aeration, the beer and mycelium were extracted. The mycelium was filtered, washed twice, each time with a volume of acetone approximately equal to the volume of the mycelium and extracted twice, each time with a volume of methylene chloride approximately equal to the volume of the mycelium. The acetone and methylene chloride extracts including solvent were added to the beer filtrate. The mixed extracts and beer filtrate were extracted successively with two one-half by volume portions of methylene chloride and then with two onefourth by volume portions of methylene chloride. The combined methylene chloride extracts were washed with two one-tenth by volume portions of a two percent aqueous solution of sodium bicarbonate and then with two one-tenth by volume portions of water. After drying the methylene chloride with about three to five grams of anhydrous sodium sulfate per liter of solvent and filtering, the solvent was removed by distillation. The residue was dissolved in hot ethyl acetate and cooled to room temperature to produce crystals. The crystals were recrystallized from ethyl acetate to give four grams of crystals having a softening point of 205 degrees centigrade and a melting point of 214 to 216 degrees centigrade. Recrystallization twice more resulted in crystals of 6β-hydroxytestosterone having a melting point of 216 to 220 degrees centigrade.

*Analysis.*—Percent calculated for $C_{19}H_{28}O_3$: C, 74.96; H, 9.27. Found: C, 73.35; H, 9.32, and an optical rotation $[\alpha]_D^{23}$ of plus 32 degrees at a concentration of 1.298 in chloroform; λ maximum of 238 millimicrons; $k$ of 44.92; E of 13,675.

The lowered λ maximum and E values as compared to 3-keto-$\Delta^4$ steroids is characteristic of 6β-hydroxy steroids.

*Example 2.—6β-hydroxy-10-normethyltestosterone*

A medium was prepared of 0.5 gram of soy flour, two grams of dextrose, and 0.5 gram each of debittered brewer's yeast extract, sodium chloride, and potassium dihydrogen phosphate diluted with tap water to 100 milliliters and adjusted with hydrochloric acid to a pH of 4.5. This sterilized medium was inoculated with spores of *Rhizopus reflexus* ATCC 1225, from a malt agar slant, and incubated for 24 hours at a temperature of 28 degrees centigrade using agitation and aeration corresponding to an oxygen uptake of eight millimoles per hour per liter of $Na_2SO_3$ according to Cooper, Fernstrom and Miller, Ind. Eng. Chem., 36, 504 (1944). To this medium, containing a 24-hour growth of *Rhizopus reflexus*, was added twenty milligrams of 10-normethyltestosterone dissolved in one milliliter of acetone to produce a suspension of the steroid in the culture. After an additional 24-hour period of incubation under the same conditions of temperature and aeration, the beer and mycelium were extracted as in Example 1. The concentrated extract was subjected to separation by paper chromatography using a propylene glycol-toluene system to yield 11α-hydroxy-10-normethyltestosterone and 6β-hydroxy-10-normethyltestosterone.

*Example 3.—6β-hydroxy-10-normethyltestosterone*

Otherwise like Example 2, similar results were produced by fermentation of *Rhizopus reflexus* in a medium consisting of two grams of corn steep liquor, two grams of dextrin, 0.10 gram of potassium dihydrogen phosphate, 0.2 gram of sodium nitrate, 0.5 gram of magnesium sulfate heptahydrate, 0.02 gram of potassium chloride, 0.001 gram of ferrous sulfate heptahydrate, and 0.25 gram sodium acetate diluted with tap water to 100 milliliters and adjusted with concentrated sodium hydroxide to a pH of 7.0.

*Example 4.—6β-hydroxy-10-normethyltestosterone*

In the same manner as described in Example 1, 11α-hydroxy-10-normethyltestosterone is prepared from 10-normethyltestosterone [Birch, J. Chem. Soc. (London), 1950, 367] by subjecting the latter steroid to the oxygenating activity of *Rhizopus reflexus*. The resulting oxygenated steroid is isolated from the fermentation mixture in the same manner as described in Example 1 and purified 6β-hydroxy-10-normethyltestosterone is obtained by crystallization of the reaction product from ethyl acetate.

*Example 5.—6β-acetoxytestosterone acetate*

To fifty milligrams (0.164 millimole) of 6β-hydroxytestosterone dissolved in one milliliter of barium oxide dried pyridine was added one milliliter (0.452 millimole) of a solution of 0.462 milliliter of redistilled acetic anhydride diluted to ten milliliters with dry pyridine and the reaction mixture maintained at room temperature for sixteen hours. The reaction mixture was then diluted to fifty milliliters and thereafter placed in a refrigerator for 24 hours. The thus-produced crystalline precipitate of 6β-acetoxytestosterone acetate was filtered, washed with four one-milliliter portions of ice water and thereafter dried in vacuum at sixty degrees centigrade. The dry product was dissolved in 1.5 milliliters of methanol, the resulting solution filtered and thereafter diluted with 0.5 milliliter of water whereafter there was precipitated crystals which were filtered, washed with three one-milliliter portions of ice water and thereafter dried at seventy degrees centigrade to produce 6β-acetoxytestosterone acetate.

*Example 6.—6β-formyloxytestosterone formate*

In the same manner as Example 5, 6β-formyloxytestosterone formate is prepared by reacting 6β-hydroxytestosterone with an excess of formic acid.

*Example 7.—6β-propionyloxytestosterone propionate*

In the same manner as Example 5, 6β-propionyloxytestosterone propionate is prepared by reacting 6β-hydroxytestosterone with propionic anhydride in pyridine.

*Example 8.—6β-(β-cyclopentyl)propionyloxytestosterone β-cyclopentylpropionate*

In the same manner as Example 5, 6β-(β-cyclopentyl)propionyloxytestosterone β-cyclopentylpropionate is prepared by reacting 6β-hydroxytestosterone with β-cyclopentylpropionyl chloride in pyridine.

*Example 9.—6β-benzoxytestosterone benzoate*

In the same manner as Example 5, 6β-benzoxytestosterone benzoate is prepared by reacting 6β-hydroxytestosterone with more than about two molar equivalents of benzoyl chloride in pyridine.

*Example 10.—6β-formyloxy-10-normethyltestosterone formate*

In the same manner as Example 5, 6β-formyloxy-10-normethyltestosterone formate is prepared by reacting 6β-hydroxy-10-normethyltestosterone with an excess of formic acid.

*Example 11.—6β-acetoxy-10-normethyltestosterone acetate*

In the same manner as Example 5, 6β-acetoxy-10-normethyltestosterone acetate is prepared by reacting 6β-hydroxy-10-normethyltestosterone with more than about two equivalents of acetic anhydride in pyridine.

Example 12.—6β-propionyloxy-10-normethyltestosterone propionate

In the same manner as Example 5, 6β-propionyloxy-10-normethyltestosterone propionate is prepared by reacting 6β-hydroxy-10-normethyltestosterone with propionic anhydride in pyridine.

Example 13.—6β-(β-cyclopentyl)propionyloxy-10-normethyltestosterone β-cyclopentylpropionate In the same manner as Example 5, 6β-(β-cyclopentyl)propionyloxy - 10 - normethyltestosterone β-cyclopentylpropionate is prepared by reacting 6β-hydroxy-10-normethyltestosterone with β-cyclopentylpropionyl chloride in pyridine.

Example 14.—6β-benzoxy-10-normethyltestosterone benzoate

In the same manner as Example 5, 6β-benzoxy-10-normethyltestosterone benzoate is prepared by reaction 6β-hydroxy-10-normethyltestosterone with benzoyl chloride in pyridine.

Example 15.—6β-hydroxyandrostenedione and androstene-3,6,17-trione

To a solution of 200 milligrams of 6β-hydroxytestosterone in 2.6 milliliters of acetic acid and 2.6 milliliters of benzene, at a temperature of zero degrees centigrade, there was added 261 milligrams of potassium dichromate in 2.61 milliliters of acetic acid. After stirring for two hours at zero degrees centigrade, the reaction mixture was diluted with cold water to give a ten percent acetic acid concentration. The diluted mixture was extracted five times with ten-milliliter portions of methylene dichloride. The extract was washed twice with five-milliliter portions of two percent sodium carbonate and then twice with five-milliliter portions of water, dried with anhydrous sodium sulfate, filtered, and the solvent evaporated at room temperature to give 187.1 milligrams of crystals. These crystals were dissolved in four milliliters of benzene and chromatographed over a column of four grams of alumina (acid washed, dried at 120 degrees centigrade) and developed with eight-milliliter portions of solvent as indicated in the table.

TABLE

| Fraction | Solvent | Eluate Solids, Milligrams |
| --- | --- | --- |
| 1 | benzene | 1.2 |
| 2 | do | 0 |
| 3 | benzene-ether 9:1 | 0.5 |
| 4 | do | 2.2 |
| 5 | benzene-ether 1:1 | 14.7 |
| 6 | do | 50.8 |
| 7 | ether | 21.8 |
| 8 | do | 14.4 |
| 9 | ether-chloroform 19:1 | 10.9 |
| 10 | do | 6.0 |
| 11 | ether-chloroform 9:1 | 4.4 |
| 12 | do | 2.5 |
| 13 | ether-chloroform 1:1 | 2.0 |
| 14 | do | 0.9 |
| 15 | do | 0.5 |

Combined fractions 4, 5 and 6, totaling 67.7 milligrams, were recrystallized from 0.5 milliliter of ethyl acetate, washed three times with 0.5-milliliter portions of cold ethyl acetate and once with 0.5 milliliter of ether to give 28.7 milligrams which upon recrystallization from 0.5 milliliter of acetone by the addition of 0.5 milliliter of Skellysolve B hexane yielded 21.2 milligrams of androstene-3,6,17-trione having a melting point of 220 to 224 degrees centigrade and a characteristic infrared spectrum.

Combined fractions 7 through 14, totaling 62 milligrams, were treated in the same manner as combined fractions 4, 5 and 6 to give 32.1 milligrams of crystals from ethyl acetate and, upon recrystallization from acetone, 24.6 milligrams of 6β-hydroxyandrostenedione having a melting point of 189 to 192 degrees centigrade and the characteristic infrared spectrum. Ultraviolet spectroscopy showed λ maximum at 238, k of 41.97, and E of 12,700. Ehrenstein, J. Org. Chem., 17, 1587 (1952), reported 6β-hydroxyandrostenedione having a melting point of 193.5 to 194.5 degrees centigrade, λ maximum of 235.5 and E of 13,550.

In a similar manner, other esters of 6β-hydroxytestosterone and 6β-hydroxy-10-normethyltestosterone are prepared according to acylation procedures, as illustrated above or by reaction with ketene, ketenes of selected acids, selected acids, acid anhydrides, or acid chlorides, in an organic solvent such as pyridine or the like. Representative esters of 6β-hydroxytestosterone and 6β-hydroxy-10-normethyltestosterone thus-prepared include one to eight carbon atom carboxylic acid acyloxy esters of saturated or unsaturated, aliphatic, carbocyclic, or cycloaliphatic, aryl, arylalkyl, alkaryl, mono, di or polycarboxylic acids having less than nine carbon atoms and which form ester groups such as, for example, formyloxy, acetoxy, propionyloxy, dimethylacetoxy, trimethylacetoxy, butyryloxy, valeryloxy, hexanoyloxy, heptanoyloxy, octanoyloxy, benzoxy, phenylacetoxy, toluoyloxy, cyclopentylformyloxy, α and β-cyclopentylpropionyloxy, acrylyloxy, cyclohexylformyloxy, the half and di-esters of polybasic acids such as malonic, maleic, succinic, glutaric and adipic acids, and the like. The acids may also contain non-interfering substituents, such as mono or poly halo, chloro, bromo, hydroxy, methoxy, and the like if desired.

The 6β-hydroxytestosterone, 6β-hydroxy-10-normethyltestosterone and their esters are useful as chemical intermediates and have pharmacological activity per se. They exhibit adrenocorticotropic hormone inhibition and androgenic properties and they differ from testosterone in renotropic activity. Oxidation of 6β-hydroxytestosterone with chromium trioxide produces the known 6β-hydroxyandrostenedione and androstene-3,6,17-trione. Similarly, oxidation of 6β-hydroxy-10-normethyltestosterone produces 6β-hydroxy-10-normethylandrostenedione and 10-normethylandrostene-3,6,17-trione.

It is to be understood that this invention is not to be limited to the exact details of operation or exact compounds shown and described as obvious modifications and equivalents will be apparent to one skilled in the art and the invention is therefore to be limited only by the scope of the appended claims.

We claim:

1. A compound represented by the graphical formula:

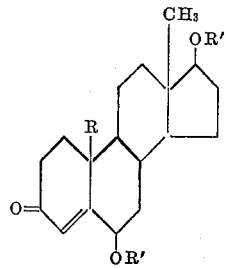

wherein R is selected from the radicals consisting of hydrogen and methyl, and R' is selected from the radicals consisting of hydrogen and hydrocarbon-carboxylic acyl radical containing less than nine carbon atoms.

2. 6β-hydroxytestosterone.
3. 6β-hydroxy-10-normethyltestosterone.
4. A 6β-acyloxytestosterone acylate represented by the structural formula:

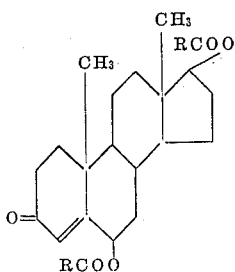

wherein R is a hydrocarbon radical containing less than nine carbon atoms.

5. A 6β - acyloxy - 10 - normethyltestosterone acylate represented by the structural formula:

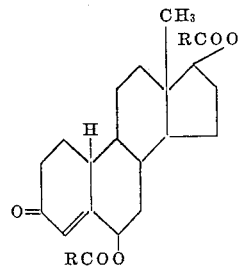

wherein R is a hydrocarbon radical containing less than nine carbon atoms.

6. 6β-acetoxytestosterone acetate.
7. 6β-propionyloxytestosterone propionate.
8. 6β - (β - cyclopentyl) propionyloxytestosterone β-cyclopentylpropionate.

9. A process of preparing a compound represented by the graphical formula:

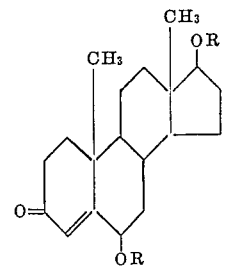

wherein R is a hydrocarbon-carboxylic acyl radical containing less than nine carbon atoms which comprises reacting 6β-hydroxytestosterone with an acylating agent of a hydrocarbon-carboxylic acid containing less than nine carbon atoms.

10. A process of preparing a compound represented by the graphical formula:

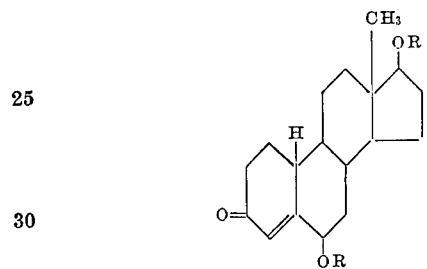

wherein R is a hydrocarbon-carboxylic acyl radical containing less than nine carbon atoms which comprises reacting 6β-hydroxy-10-normethyltestosterone with an acylating agent of a hydrocarbon-carboxylic acid containing less than nine carbon atoms.

No references cited.